(12) United States Patent
Higo

(10) Patent No.: US 12,591,743 B2
(45) Date of Patent: Mar. 31, 2026

(54) INFORMATION PROCESSING APPARATUS, INFORMATION PROCESSING METHOD, AND STORAGE MEDIUM FOR EXTRACTING A NAMED ENTITY FROM A DOCUMENT

(71) Applicant: CANON KABUSHIKI KAISHA, Tokyo (JP)

(72) Inventor: Tomoaki Higo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 286 days.

(21) Appl. No.: 18/313,252

(22) Filed: May 5, 2023

(65) Prior Publication Data

US 2023/0359828 A1     Nov. 9, 2023

(30) Foreign Application Priority Data

May 9, 2022     (JP) ................................. 2022-077175

(51) Int. Cl.
*G06F 40/295* (2020.01)
*G06F 40/284* (2020.01)

(52) U.S. Cl.
CPC .......... *G06F 40/295* (2020.01); *G06F 40/284* (2020.01)

(58) Field of Classification Search
CPC .... G06F 40/295; G06F 40/284; G06F 40/131; G06F 40/279
See application file for complete search history.

(56) References Cited

U.S. PATENT DOCUMENTS

| | | | | |
|---|---|---|---|---|
| 9,032,316 B1 * | 5/2015 | Nordstrom | ............. | G06Q 10/10 |
| | | | | 715/764 |
| 9,183,303 B1 * | 11/2015 | Goel | ........................ | G06F 16/23 |
| 11,604,925 B1 * | 3/2023 | Lee | ...................... | G06N 3/0442 |
| 2009/0319500 A1 | 12/2009 | Agrawal | | |
| 2019/0121811 A1 * | 4/2019 | Cherukuri | ............. | H04L 67/535 |
| 2020/0196028 A1 * | 6/2020 | Kuehne, Jr. | ............. | G06N 3/044 |
| 2021/0056098 A1 * | 2/2021 | Raman | ..................... | G06F 40/35 |
| 2021/0081613 A1 | 3/2021 | Begun | | |
| 2021/0216716 A1 * | 7/2021 | Wang | ........................ | G06F 16/35 |
| 2022/0253871 A1 * | 8/2022 | Miller | ...................... | G06F 16/36 |
| 2022/0417261 A1 * | 12/2022 | Rashidi | ................. | G06F 16/245 |
| 2023/0061725 A1 * | 3/2023 | Khan | ...................... | G06F 16/93 |

FOREIGN PATENT DOCUMENTS

| | | | |
|---|---|---|---|
| EP | 3716104 A1 | | 9/2020 |
| JP | 2021064143 A | * | 4/2021 |

OTHER PUBLICATIONS

JP2021064143A-MT (Year: 2021).*

* cited by examiner

*Primary Examiner* — Darioush Agahi
(74) *Attorney, Agent, or Firm* — Canon U.S.A., Inc. IP Division

(57) ABSTRACT

An information processing apparatus for converting text data from a document image read from a document into a token string and calculates a number of processing times necessary for performing processing in a natural language processing model based on the token string. Then, at the time of division, the information processing apparatus divides the token string into blocks so that at least a portion overlaps between adjacent blocks based on the calculated number of processing times and for each token belonging to the overlap portion between the adjacent blocks, selects one of estimation results obtained from each block.

15 Claims, 11 Drawing Sheets

400

| Identifier | token | GT |
|---|---|---|
| T1_001 | Estimate | 0 |
| T1_002 | To | 0 |
| T1_003 | ABC | B-ORG |
| T1_004 | Inc | I-ORG |
| T1_005 | EXPIRATION | 0 |
| T1_006 | DATE | 0 |
| ... | ... | ... |
| T1_259 | at | 0 |
| T1_260 | all | 0 |
| T1_261 | . | 0 |

I like red.  He likes: green; blue; and yellow, but not black.  She likes white. ⁓700
I like red.  He likes: green; blue; and yellow ⁓701
      .  He likes: green; blue; and yellow, but not black.  She likes white. ⁓702

/I like red.  He likes: green; blue; and yellow, but not black./  She likes white./ ⁓710
I like red. ⁓711
      He likes: green; blue; and yellow, but not black.  She likes white. ⁓712

/I like red./  He likes:/ green;/ blue;/ and yellow,/ but not black./  She likes white./ ⁓720
I like red.  He likes: green; ⁓721
      He likes: green; blue; and yellow, but not black.  She likes white. ⁓722

I/ like/ red/./  He/ likes/:/ green/:/ blue/;/ and/ yellow/,/ but/ not/ black/./  She/ likes/ white/./ ⁓730
I like red.  He likes: green; blue; and ⁓731
      .  He likes: green; blue; and yellow, but not black.  She likes white. ⁓732

FIG.7

INFORMATION PROCESSING APPARATUS, INFORMATION PROCESSING METHOD, AND STORAGE MEDIUM FOR EXTRACTING A NAMED ENTITY FROM A DOCUMENT

BACKGROUND

Field

The present disclosure relates to a technique to extract a named entity from a document.

Description of the Related Art

As a technique to extract a character string (named entity) corresponding to an item defined in advance from a document, generally, NER (Named Entity Recognition) is known. According to this NER, for example, by defining in advance items "company name" and "expiration date", it is possible to extract character strings "ABC Company" and "2022/03/07" corresponding to "company name" and "expiration date" respectively from text within a document. It is possible for a natural language processing model represented by Seq2Seq and Transformer, which are the mainstream in natural language processing in recent years, to obtain processing results by taking a token string as an input, which is obtained by dividing text within a document into units called token. In a case where the model such as this is used for named entity extraction, it is possible to efficiently estimate a named entity from the input token string. On the other hand, there is an upper limit to the number of tokens that can be input to a model at a time, and therefore, in a case where long text is input, it is necessary to divide the text into a plurality of token strings. In this regard, Japanese Patent Laid-Open No. 2021-64143 has disclosed a method of extracting a named entity for each section by dividing a document into sections, such as chapters, clauses, and paragraphs.

In a case where a token string is obtained by dividing text within a document into predetermined sections by the method of Japanese Patent Laid-Open No. 2021-64143 described above, the probability that the number of tokens configuring the token string is included within the input upper limit is highly likely. However, as a result of each section being processed independently, there is a case where a key word necessary for determining a named entity is lost or the context of the entire sentence is broken, and as a result of that, it may happen that it is not possible to extract a named entity successfully. Further, the finer the section unit is specified, the larger the number of times the section is input to a model and processed becomes, and as a result of that, the processing time increases.

SUMMARY

The present disclosure has been made in view of the circumstance above and an object is to achieve both improvement of accuracy in named entity extraction and suppression of an increase in processing time.

The information processing apparatus according to the present disclosure is an information processing apparatus that extracts a named entity from a document by using a natural language processing model and includes: one or more memories storing instructions; and one or more processors executing the instructions to: obtain text data from a document image read from the document; convert the text data into a token string by performing processing to decompose the text data into each token; calculate a number of processing times necessary for performing processing in the natural language processing model based on the token string; divide the token string into blocks that can be processed by the natural language processing model; and estimate a named entity by performing processing to input each of the blocks to the natural language processing model, wherein in the dividing, based on the calculated number of processing times, the token string is divided into the blocks so that at least a portion overlaps between adjacent blocks and in the processing, for each token belonging to the overlap portion between the adjacent blocks, one of estimation results obtained from each of the blocks is selected.

Further features of the present disclosure will become apparent from the following description of exemplary embodiments with reference to the attached drawings.

BRIEF DESCRIPTION OF THE DRAWINGS

FIG. 7 is a diagram showing an example of results in a case where a separation condition is applied to a temporary block;

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

Figure 1:
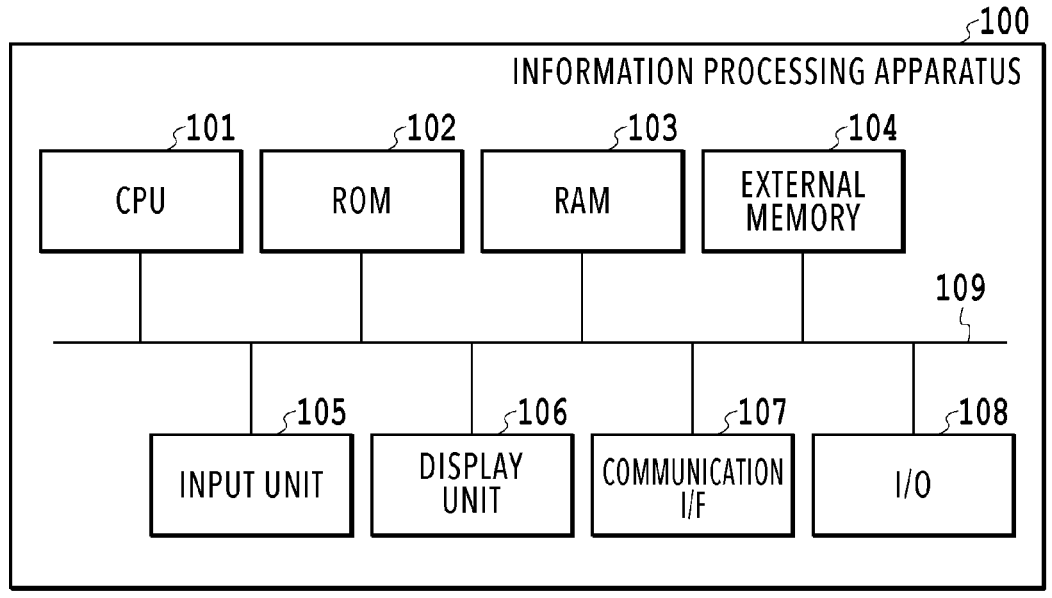
FIG. 1 is a diagram showing a hardware configuration of an information processing apparatus.

First, the hardware configuration of an information processing apparatus shown in each embodiment is explained by using FIG. 1.

FIG. 1 is a hardware configuration diagram of an information processing apparatus 100. In FIG. 1, a CPU 101 performs control of various devices connected to a system bus 109. A ROM 102 stores BIOS (Basic Input/Output System) programs and boot programs. A RAM 103 is used as a main storage device of the CPU 101. An external memory 104 stores programs that are processed by the information processing apparatus. An input unit 105 includes various devices that are used to input information and the like, for example, such as a touch panel, a keyboard, a mouse, and a robot controller. A display unit 106 includes a liquid crystal monitor, a projector, an LED indicator and the like and displays a user interface screen (UI screen), computing results and the like in accordance with instructions from the CPU 101. A communication I/F 107 is an interface that performs information communication with an external device via a network, such as LAN and the internet, in accordance with communication standards, such as Ethernet (registered trademark), USB, and WiFi. An I/O 108 is an input/output unit configured to connect with, for example, a scanner, not shown schematically, receive data of a scanned image of a document (in the following, called "document image"), and so on.

First Embodiment

In the present embodiment, in a case where the number of tokens of a token string obtained from input text exceeds the upper limit of the number of tokens that can be input to a natural language processing model, the number of processing times necessary for processing all the tokens is found and the input text is divided so that the token strings overlap within a range in which the number of processing times does not increase. By doing so, the accuracy of named entity extraction is improved while suppressing an increase in processing time. As the natural language processing model trained in advance, for example, mention is made of BERT (Bidirectional Encoder Representations from Transformers), XLNet and the like. It may also be possible to utilize a model trained from the beginning in advance in place of utilizing the model publicly disclosed as described above. Further, the model does not necessarily need to be one having a transformer-based structure and any highly accurate natural language processing model trained in advance may be accepted. For example, a model having a uniquely designed structure, or a model having a structure designed automatically by AUTOML and the like may also be accepted. In the following, explanation is given by taking a case as an example where BERT is utilized as a natural language processing model trained in advance.

<System Configuration>

Figure 2:
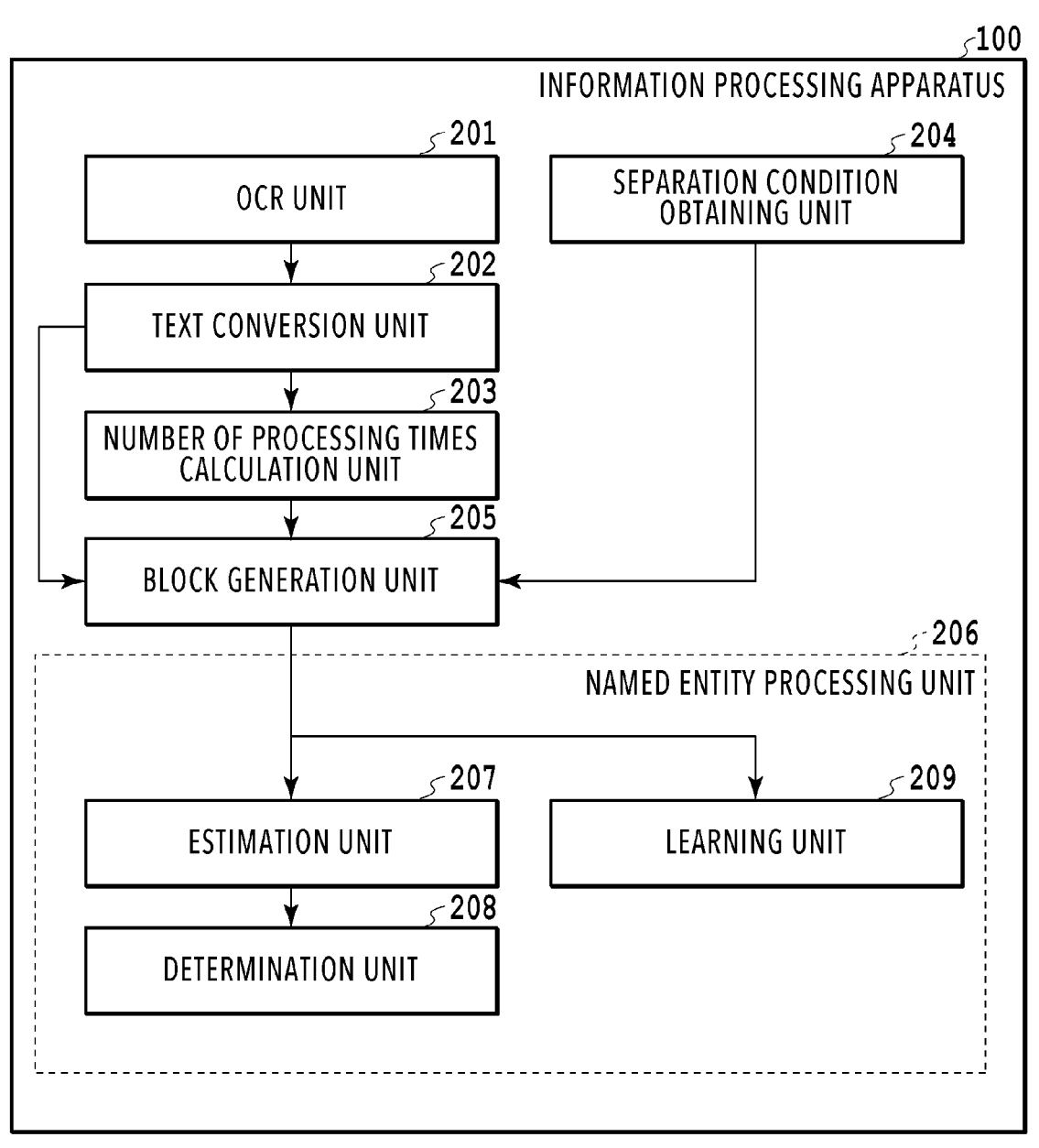
FIG. 2 is a diagram showing a function configuration example of the information processing apparatus.

FIG. 2 is a diagram showing a function configuration example of the information processing apparatus 100 that extracts a named entity from a document image according to the present embodiment. The information processing apparatus 100 has an OCR unit 201, a text conversion unit 202, a number of processing times calculation unit 203, a separation condition obtaining unit 204, a block generation unit 205, and a named entity processing unit 206. In the following, each function unit is explained.

The OCR unit 201 obtains information (text data) on characters existing within a document by performing OCR (Optical Character Recognition) for an image area (character area) corresponding to characters within a document image. This text data is generated by, for example, performing a scan from left to right and from up to down based on coordinates of each character area and combining recognized corresponding character strings in order. However, the text data obtaining method is not limited to the method in which OCR is performed for a document image, and for example, in a case where text data is included separate from image data within an electronic file of a document, it may also be possible to obtain the text data. Alternatively, it may also be possible to obtain text data obtained by transcription of voice information. The obtained text data is delivered to the text conversion unit 202.

The text conversion unit 202 performs morphological analysis for the input text data, decomposes the text data into tokens by performing word segmentation (writing with a space between words) for each obtained morpheme, and converts the tokens into token strings, which is sets of tokens. Here, the token is the smallest unit of language information that is input to a neural network model. Here, the token unit is taken to be morpheme, but the unit is not limited to this. For example, it may also be possible to employ the clause unit, word unit, or character unit as the token unit. It is only required for a natural language processing model used to estimate a named entity to decompose text data into tokens in accordance with the token unit set at the time of learning. The obtained token string is delivered to the number of processing times calculation unit 203 and the block generation unit 205.

The number of processing times calculation unit 203 calculates the number of processing times based on the number of tokens configuring the token string received from the text conversion unit 202 and the maximum number of tokens that can be processed by (can be input at a time to) the natural language processing model to be used. Specifically, in a case where the number of tokens (length of the token string) configuring the token string is taken to be T and the maximum number of tokens (upper limit number of tokens) that can be input at a time from the token string to the natural language processing model is taken to be L, then a number of processing times P is expressed by formula (1) below.

$$P = \text{RoundUp}(T/L) \qquad \text{formula (1)}$$

In formula (1) described above, "RoundUp" is a function for rounding up the fractional part. This number of processing times P is the minimum number of times the processing should be performed, which is required for inputting all the number of tokens T to BERT. In a case where an input block is generated while overlapping the token string in the block generation unit 205, to be described later, in order to cause at least M tokens to overlap, it is sufficient to replace formula (1) described above with formula (2) below.

$$P = \text{RoundUp}((T-M)/(L-M)) \qquad \text{formula (2)}$$

Information on the number of processing times P calculated by using formula (1) described above or formula (2) described above is delivered to the block generation unit 205. Here, a specific example is shown. Here, in a case where the number of tokens that can be input to BERT at a time is 512 and "CLS" and "SEP" are used, which are special tokens representing the top and end of the token string, the upper limit number of tokens L=512−2=510. In a case where the number of tokens of the token string that is input is 1,000, by formula (1) described above, 1,000/510=1.96 and the number of processing times P=2 is obtained by the rounding-up function. Further, in a case where the number of tokens desired to be overlapped is taken to be M=32, by formula (2) described above, the number of processing times P is calculated as (1,000−32)/(510−32)=2.02, and then, by the rounding-up function, the number of processing times P=3 is obtained.

The separation condition obtaining unit 204 obtains the condition (in the following, called "separation condition") for separating a token string at an appropriate position in order to understand the context at the time of dividing the token string into input blocks in the block generation unit 205, to be described later. As the separation condition, mention is made of "separate between paragraphs", "separate between lines", "separate at period", "separate at comma, colon, and semicolon", "separate between tokens" and the like. The separation condition obtaining unit 204 obtains at least two or more separation conditions and classify the conditions into levels in accordance with the degree of fineness of separation, the finest separation of a token string is "separate between tokens" under which condition it is possible to separate at any position in the token string. An example is given. For example, it is assumed that there is a sentence "This is an apple. That is an orange." In a case where the temporary input block, to be described later, is "apple. That is an orange.", on a condition that the separation condition is "separate at period", the input block is divided into "apple." and "That is an orange." and "That is an orange." can be taken as the input block. By the separation conditions classified into levels, it is possible to reduce the influence of such situation that the context becomes hard to understand because, for example, a character string "apple." appears unexpectedly at the top, and therefore, it is made possible to improve the accuracy of estimation and learning. The separation conditions classified into levels such as those (in the following, called "condition group") are delivered to the block generation unit 205.

The block generation unit 205 divides the token string received from the text conversion unit 202 into blocks (in the following, described as "input block") of the number of tokens that can be input to BERT. In a case where a named entity is estimated from text data, it is difficult to know in advance where a named entity exists in the token string. Except in a case where it is known in advance based on particular information that a named entity does not exist in a specific range within the token string or that it is not necessary to estimate a named entity, usually all token strings are input to BERT. The block generation unit 205 first determines P temporary input blocks consisting of the upper limit number of tokens L while allowing overlap between blocks based on the number of processing times P so that token strings overlap each other. In the following, the P temporary input blocks determined here are referred to as "temporary block". Further, the block generation unit 205 deletes tokens at both ends of the temporary block based on the separation condition included in the condition group in each temporary block. The input block obtained by deleting tokens at both ends of the temporary block as described above is input to BERT. Details of the processing to divide the token string into input blocks will be described later. Data of the divided input block is delivered to the named entity processing unit 206.

The named entity processing unit 206 includes an estimation unit 207, a determination unit 208, and a learning unit 209 and performs each piece of processing necessary for extracting a named entity from a token string. In the following, each unit configuring the named entity processing unit 206 is explained.

The estimation unit 207 inputs the input block received from the block generation unit 205 to BERT and performs processing to estimate a named entity from the input block. BERT that is used here is, in detail, a neural network model in which the fully connected layer (unique layer) for performing multi-class classification is added to the BERT layer. Each token included in the input block is converted into a vector in the format that can be input to BERT after being encoded and input to the BERT layer. By further performing multi-class classification for the output of the BERT layer by the fully connected layer, it is possible to obtain a named entity tag corresponding to the input token. For example, in a case where the input block is "ABC Inc.", it is assumed that two tokens of "ABC" and "Inc." are included. For each token, as a named entity tag in the IOB (Inside-Outside-Beginning) format, "B-ORG" indicating the top token of the company name and "I-ORG" that follows are estimated. Due to this, it is possible to regard the ABC Inc., which is the company name, as having been estimated as a named entity. The tag that begins with "B" represents the top token of a named entity and the tag that begins with "/" represents the second and subsequent tokens of a named entity. For the purpose of being capable of solving the multi-class classification problem such as this, learning of the BERT layer and the fully connected layer is performed in advance in the learning unit 209, to be described later. Due to this, the estimation unit 207 implements estimation of a named entity. In a case where a named entity tag is estimated, a score is calculated, which indicates likelihood, for each named entity tag, which is the estimation candidate, and takes the named entity tag whose score is the highest as the estimation results. The named entity tag in the IOB format thus estimated and the information on the score are delivered to the determination unit 208.

The determination unit 208 determines the named entity to be output finally based on the named entity tag and the score, both received from the estimation unit 207. First, for the range without overlap of the input block, there is only one named entity tag estimated by the estimation unit 207 for each token, and therefore, it is sufficient to determine the results as the named entity. On the other hand, for the range with overlap of the input block, the estimation unit 207 estimates a plurality of named entity tags for each token. Because of this, it is necessary to determine one named entity tag from among the plurality of named entity tags. In a case of selecting one named entity tag from the plurality of named entity tags, it is sufficient to select the named entity tag whose score is the highest. Alternatively, it may also be possible to calculate the sum of the plurality of scores obtained for each named entity tag and select the named entity tag whose sum of scores is the highest. In this manner, for the portion with overlap in the input block, the named entity tag whose score is the highest is selected and the value of the named entity is determined. The determined value of the named entity is displayed on, for example, the display unit 105.

Figure 3:
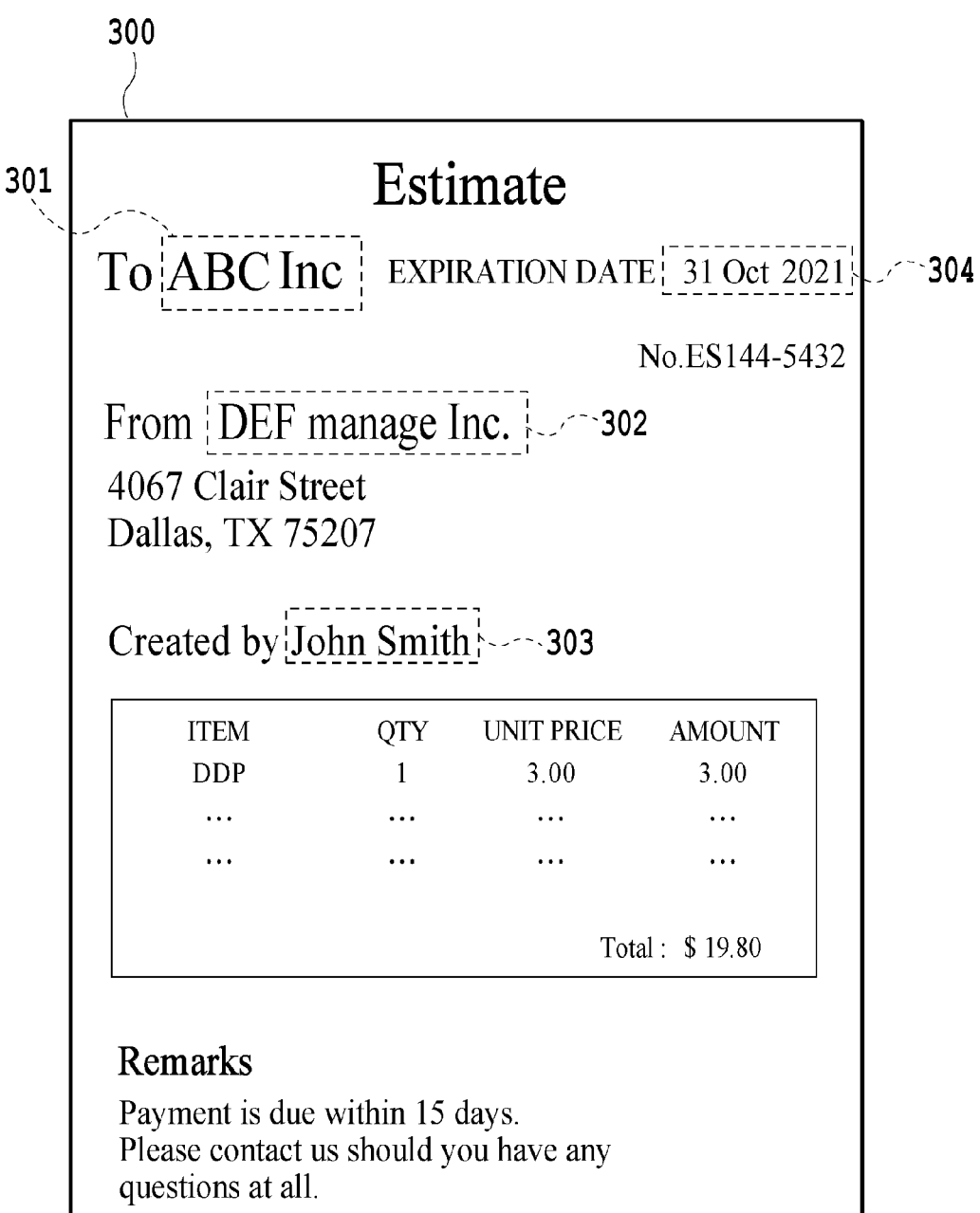
FIG. 3 is a diagram explaining a specific example in a case where a named entity is extracted from a document image.
Figure 4:
FIG. 4 is an example of a table showing results of appending GT to a character string corresponding to a token.

The learning unit 209 performs learning by using the tokens configuring the input block with the BERT layer and the fully connected layer for performing estimation in the estimation unit 207 being taken as a multi-class classifier. For this learning, the input and output dataset, specifically, supervised data is used, which is a variety of document images to which correct answer data normally called "GT (Ground Truth)" is appended. In a case of the present embodiment, to each token included in the token string, "B-ORG", a named entity tag, or the like is appended as GT. For example, in a case where it is desired to estimate three of company name, person's name, and date as a named entity from the input block, as a named entity tag, one of a total of seven named entity tags is allocated to each token, which are "B-OGR" representing company name, "I-ORG" that follows, "B-PERSON" representing person's name, "I-PERSON" that follows, "B-DATE" representing date, "I-DATE" that follows, and further, "O" representing not being a named entity. Here, a specific example of a case where a named entity is extracted from a scanned image of an estimate form is explained with reference to FIG. 3. Here, a case where three types of company name, person's name, and date are estimated as a named entity from a document image 300 is considered, and in this case, to a character string "ABC Inc" in a character area 301 and a character string "DEF manage Inc." in a character area 301, GT of company name is appended. Then, to a character string "John Smith" in a character area 303, GT of person's name is appended and to a character string "31 Oct. 2021" in a character area 304, GT of date is appended in advance. FIG. 4 is a table showing the results of appending GT to the character strings corresponding to the tokens included in the document image 300 shown in FIG. 3. A table 400 shown in FIG. 4 includes three columns of "Identifier", "token", and "GT" and each row indicates a token. For example, to the token "Estimate" in the first row, the tag of "O" representing not being a named entity is appended. Further, to the token "ABC" in the third row, "B-OGR" is appended and to the token "Inc" in the forth row, "I-ORG" is appended and this indicates that "ABC Inc" is company name "ORG". In this manner, to the token string corresponding to the text within the document, the named entity tag is appended as GT in advance. The learning unit 209 refers to the table 400 for each input block and turns each token within "token" into a vector after encoding it and then inputs it to the BERT layer. Then, the learning unit 209 finds Loss and gradient by comparing the multi-class classification results output from the fully connected layer and GT corresponding to each token and modifies the weights in the BERT layer and the fully connected layer. By performing this repeatedly to update the weights in the BERT layer and the fully connected layer, learning is performed. The weights obtained by learning are used in estimation processing in the estimation unit 207.

In the present embodiment, the three functions of the estimation unit 207, the determination unit 208, and the learning unit 209 exist within the named entity processing unit 206 of the one information processing apparatus 100, but it is not necessarily required for one apparatus to have these three function units. For example, it may also be possible to divide one information processing apparatus into a first information processing apparatus having a hardware configuration comprising both the functions of the estimation unit 207 and the determination unit 208 and whose specifications are comparatively low, and a second information processing apparatus having a hardware configuration comprising the function of the learning unit 209 and whose specifications are comparatively high. In this case, it is possible to provide a server edge system whose cost is suppressed by performing a large amount of learning using a large amount of supervised data in the second information processing apparatus and performing estimation whose load is light in the first information processing apparatus.

<Division of Token String>

Next, a flow of processing to generate an input block by dividing a token string is explained with reference to the flowchart in FIG. 5. In the following explanation, a symbol "S" means a step.

At S501, initialization processing is performed. Specifically, processing as follows is performed.

- Load a weigh of a natural language processing model (in the following, simply described as "model") and obtain and set the upper limit number of tokens L of input
- Obtain and set a token division method for word segmentation
- Obtain and set the upper limit number of tokens L that can be input to a model at a time and the minimum number of tokens M that are caused to overlap
- Obtain a separation condition group and perform classification into levels and output them to the block generation unit 205

At S502, the OCR unit 201 obtains text data from the document image. The obtained text data is delivered to the text conversion unit 202.

At S503, the text conversion unit 202 converts the input text data into token strings by performing processing to decompose the input text data into units of tokens. The converted token strings are delivered to the number of processing times calculation unit 203 and the block generation unit 205.

At S504, the number of processing times calculation unit 203 calculates the number of processing times of the token strings obtained at S503 based on the upper limit number of tokens L set at S501. The calculated number of processing times is delivered to the block generation unit 205.

Figure 6:
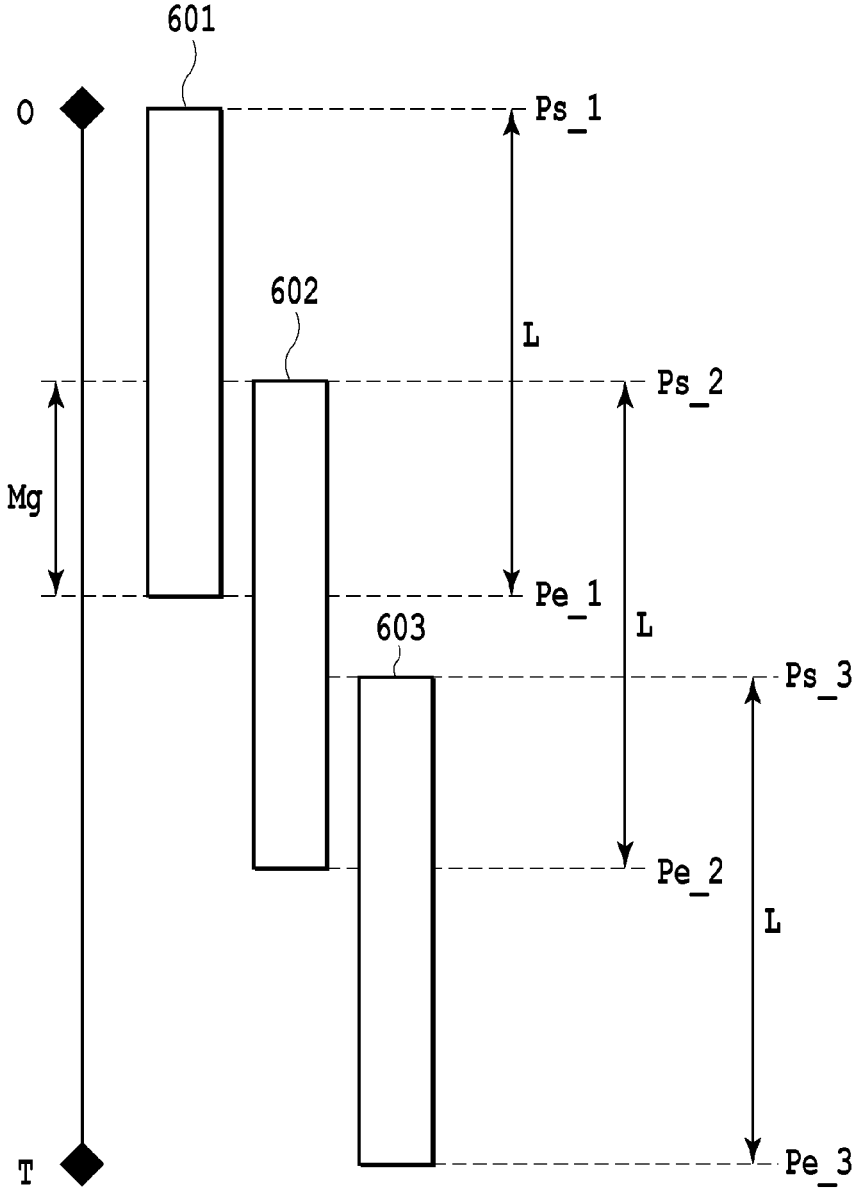
FIG. 6 is a diagram showing the way a temporary block is determined by overlapping a token string whose length is T.

At S505, the block generation unit 205 receives the token string whose length is T and the number of processing times P and determines P temporary blocks in accordance with the upper limit number of tokens L. FIG. 6 is a diagram showing the way temporary blocks are determined by overlapping the token string whose length is T in a case where the number of processing times P=3. Three temporary blocks 601 to 603 whose portions overlap are determined. In this case, Mg indicates the range in which the temporary block 601 and the temporary block 602 overlap. Here, in a case where the number of ranges in which overlap occurs is increased as much as possible with the number of processing times P, the length of the range Mg is found by next formula (3).

$$Mg=(P \times L-T)/(P-1) \qquad \text{formula (3)}$$

In a case where the number of processing times P=3, the upper limit number of tokens L=512, and the length T of the token string=1,200, then $Mg=(3 \times 510-1,200)/(3-1)=165$, and therefore, 165 tokens overlap per temporary block.

Further, a start position Ps and an end position Pe of a kth temporary block with respect to the top (first) temporary block are expressed by formula (4) and formula (5) below, respectively.

$$Ps=(k-1)-(L-Mg) \qquad \text{formula (4)}$$

$$Pe=(k-1) \times (L-Mg)+L \qquad \text{formula (5)}$$

Consequently, in the example in FIG. 6, the first temporary block 601 is from a start position Ps_1, which is the position of the first token, to an end position Pe_1. Further, the second temporary block 602 is from a start position Ps_2 to an end position Pe_2 and the start position Ps_2 is equal to L-Mg. Similarly, the third temporary block 603 is from a start position Ps_3 to an end position Pe_3 and the start position Ps_3 is equal to 2 L-2 Mg. Then, the length of each of the three temporary blocks 601 to 603 corresponds to the upper limit number of tokens L. It is designed so that the last token in the last temporary block is located at the end of the token string whose length is T, and due to this, it is possible to use data efficiently. In this manner, the block generation unit 205 first determines the P temporary blocks from the length T of the token string and the number of processing times P.

At the next step S506, the block generation unit 205 generates an input block by deleting the tokens located at both ends (or token at one of ends) of the temporary block determined at S505 in accordance with each separation condition included in the condition group received from the separation condition obtaining unit 204. Here, explanation is given by using a specific example, FIG. 7 shows results in a case where three types of separation condition are applied to two temporary blocks determined for a token string 700 of "I like red. He likes: green; blue; and yellow, but not black. She likes white.". Here, a first temporary block 701 is the range of "I like red. He likes: green; blue; and yellow" and a second temporary block 702 that follows is the range of ". He likes: green; blue; and yellow, but not black. She likes white.". Here, a case is explained where the separation conditions included in the received condition group are classified into three levels of "separate at period", "separate at comma, colon, and semicolon", and "separate between tokens" whose separation become finer in this order.

<<In a Case of Separating at Period>>

A token string 710 indicates a character string in a case where the token string 700 is separated at the period and divided and "/" indicates the separation position. As a result of deleting the end of the temporary block in accordance with the separation condition "separate at period", the input block whose range sandwiched by "/" and "/" is the longest is obtained. From the token string 710 in a case where the token string 700 is separated at the period, first, the range of "I like red." is generated as a first input block by deleting "He likes: green; blue; and yellow" from the rear end of the first temporary block 701. Further, by deleting "." from the front end of the second temporary block 702, the range of "He likes: green; blue; and yellow, but not black. She likes white" is generated as a second input block.

<<In a Case of Separating at Comma, Colon, and Semicolon>>

A token string 720 indicates a character string in a case where the token string 700 is separated at the comma, colon, and semicolon and divided and "/" indicates the separation position. As a result of deleting the end of the temporary block in accordance with the separation condition "separate at comma, colon, and semicolon", the input block whose range sandwiched by "/" and "/" is the longest is obtained. From the token string 720 in a case where the token string 700 is separated at the period, colon, and semicolon, first, the range of "I like red. He likes: green; blue;" is generated as the first input block by deleting "and yellow" from the rear end of the first temporary block 701. Further, by deleting "." from the front end of the second temporary block 702, the range of "He likes: green; blue; and yellow, but not black. She likes white." is generated as the second input block.

<<In a Case of Separating Between Tokens>>

A token string 730 indicates a character string in a case where the token string 700 is separated between tokens and divided and "/" indicates the separation position. As a result of deleting the end of the temporary block in accordance with the separation condition "separate between tokens", the input block whose range sandwiched by "/" and "/" is the longest is obtained. From the token string 730 in a case where the token string 700 is separated between tokens, first, the range of "I like red. He likes: green; blue; and" is generated as the first input block by deleting "yellow" from the rear end of the first temporary block 701. Further, by deleting nothing from the front end of the second temporary block 702, the range of ". He likes: green; blue; and yellow, but not black. She likes white." is generated as the second input block.

The block generation unit 205 starts with the separation condition whose separation is the coarsest among the plurality of separation conditions included in the condition group and generates the input block by deleting the temporary block while changing the separation condition. In a case where the number of tokens of the input block is smaller than the upper limit number of tokens L as a result of deleting the temporary block (or from the beginning), processing to shift the tokens toward the top side and fill the empty portion on the rear side of the input block with special tokens called padding tokens is performed to achieve the upper limit number of tokens L. Due to this, the number of tokens configuring the input block is made to be equal to the upper limit number of tokens L that can be input to the model.

A S507, the block generation unit 205 checks whether there is an overlap portion between adjacent input blocks in all the generated input blocks. In a case where it is possible to check that there is an overlap portion between adjacent input blocks in all the input blocks, it is determined that optimum input blocks are generated and the processing is terminated. On the other hand, in a case where there is even one pair of input blocks between which no overlap portion exists, the processing advances to S508.

At S508, the block generation unit 205 changes the separation condition that is applied to one whose separation is one level finer. For example, in a case where the above-described three separation conditions are included in the condition group and the separation condition currently being applied is "separate at period" and there is a portion at which no overlap can be checked, the separation condition is changed to "separate at comma, colon, and semicolon". After changing the separation condition to one whose separation is one level finer, the processing returns to S506 and the processing is continued. The processing such as this is repeated until overlap exists between every pair of adjacent input blocks. In the example in FIG. 7 described above, at the point of time at which "separate at comma, colon, and semicolon" is applied as the separation condition, the portion of "He likes: green; blue;" overlaps, and therefore, the processing terminates in this stage.

The above is the contents of the processing to generate input blocks from a token string according to the present embodiment. Due to this, it is made possible to obtain input blocks in the form by which it is easy to understand the context from the token string whose length is T while guaranteeing the minimum number of processing times. As a result of that, the present embodiment contributes to the improvement of the accuracy of estimation and learning of a named entity.

<Extraction Processing of Named Entity>

Figure 8:
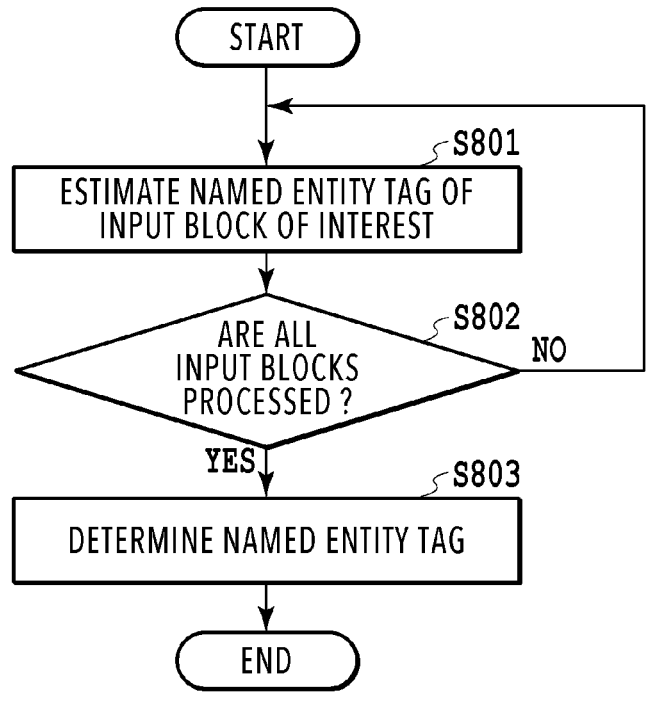
FIG. 8 is a flowchart showing a flow of processing to extract a named entity from an input block group.

Next, a flow of processing to extract a named entity in the named entity processing unit 206 from the input block group generated from a token string as described above is explained with reference to the flowchart in FIG. 8. In the following explanation, a symbol "S" means a step. At S801, the estimation unit 207 determines an input block of interest from among the received input block group and inputs it to a model and estimates a named entity tag for each token. The estimation results (estimated one or plurality of named entity tags and score for each named entity tag) are delivered to the determination unit 208.

At S802, whether the estimation is completed for all the input blocks included in the received input block group is determined. In a case where the estimation processing for all the input blocks is completed, the processing advances to S803. On the other hand, in a case where there remains an unprocessed input block, the processing returns to S801, and the next input block of interest is determined and the estimation processing of a named entity is continued. At S803, the determination unit 208 determines one named entity tag for each token based on the estimation results (estimated named entity tag and score thereof) for all the input blocks included in the input block group.

The above is the contents of the named entity extraction processing in the named entity processing unit 206. The named entity tag determined for each token as described above is presented to a user, for example, by displaying it on the display unit 106. For example, it is assumed that the following processing results represented by a set of {"token", 'named entity tag'} are obtained.

{ESTIMATE, 'O'}
{To, 'O'}
{ABC, 'B-ORG'}
{Inc, 'I-ORG'}
{Contact, 'O'}
{John, 'B-PERSON'}
{Smith, 'I-PERSON'}
{DATE, 'O'}
{31, 'B-DATE'}
{Oct, 'I-DATE}
{2021, 'I-DATE'}

In this case, for example, on the display unit 106, "ABC Inc" is displayed as "ORG" representing a company name, "John Smith" is displayed as "PERSON" representing a person's name, and "31 Oct. 2021" is displayed as "DATE" representing a date. As the output aspect of the processing results, producing a display on the display is an example and the aspect is not limited to this.

Modification Example 1

Figure 5:
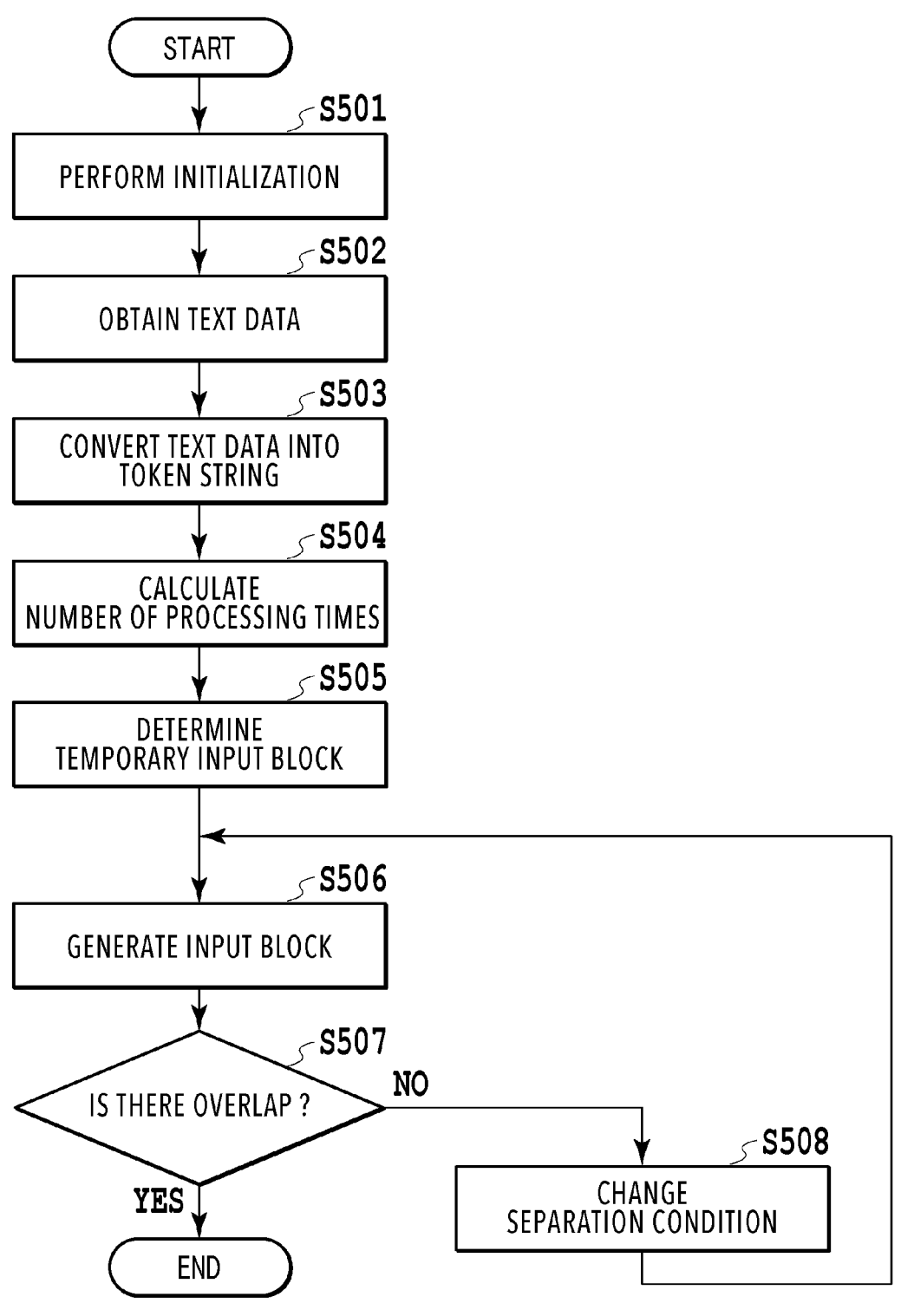
FIG. 5 is a flowchart showing a flow of processing to generate an input block by dividing a token string.

In a case where input blocks are generated from a token string, in the flowchart in FIG. 5, the processing is terminated on the condition that there is not a single portion at which no overlap exists after deleting the token at the end of a temporary block in accordance with a separation condition (S507). However, in a case where the following conditions are satisfied, it may also be possible to terminate the processing even in a case where there is a portion at which no overlap exists.

<<Condition>>

Two input blocks corresponding to a portion at which no overlap exists overlap each other in a state of being of temporary block The token next to the last token of the input block on the front side, which is obtained by deleting the token at the end in accordance with a separation condition is the top token of the input block on the rear side and there exists no token that is not processed Due to this, it is possible to generate input blocks by division at a coarser level and it is made easier to grasp consistency of context.

Modification Example 2

In a case where input blocks are generated from a token string, in the flowchart in FIG. 5, the input blocks are generated by fixing the number of processing times P and changing the separation condition stepwise. However, it may also be possible to fix the separation condition and increase the number of processing times P. Specifically, first, one separation condition that is fixed is determined. Next, in a case where there is a token that does not overlap between adjacent input blocks on a condition that each temporary block is deleted in accordance with a separation condition with the number of processing times P, the number of processing times P is incremented to (P+1). Then, Mg is found again from formula (3) described previously and Mg that is found is applied to formula (4) and formula (5) described previously, and the range of the temporary block is determined. Then, each temporary block thus determined is deleted in accordance with the fixed separation condition and whether there is not a single portion at which no overlap exists in all the obtained input blocks is checked. Then, in a case where there is even one portion at which no overlap exists, the number of processing times P is incremented again and the same processing is repeated. In a case where the condition is not satisfied, it may be possible to terminate the generation of input blocks. In a case of the present modification example, although the number of processing times P increases, it is made easier to grasp consistency of context, and therefore, it is possible to improve the estimation accuracy of a named entity.

Modification Example 3

Figure 9:
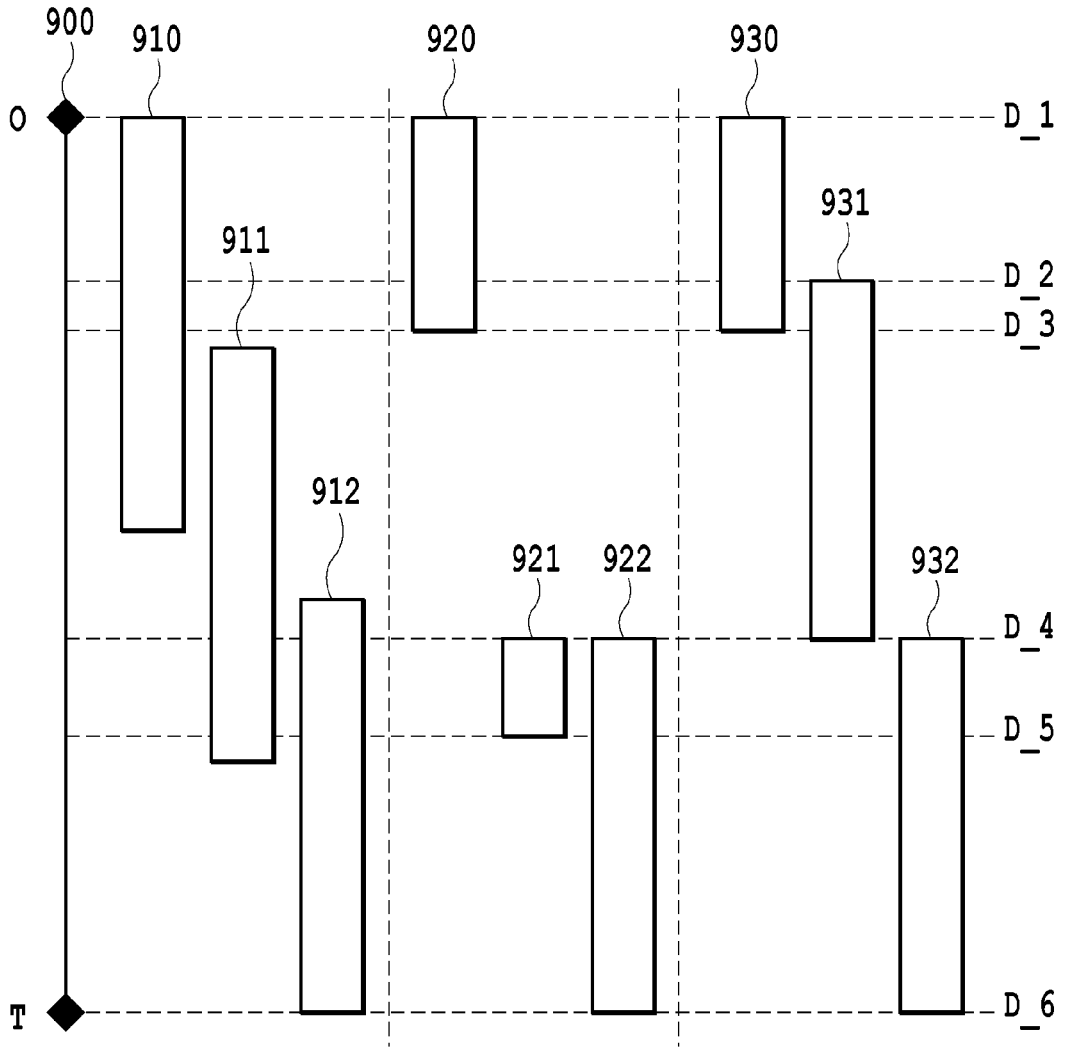
FIG. 9 is an explanatory diagram of modification example 3.

In a case where input blocks are generated from a token string, in the flowchart in FIG. 5, the input blocks are generated by deleting the token located at the end of a temporary block in accordance with a separation condition after determining the temporary block. However, for example, it may also be possible to specify in advance a position at which separation is possible by the separation condition and then generate input blocks with the number of processing times P. A specific method is as follows. First, as a premise, it is assumed that there exist N positions D_1 to D N as positions at which separation is possible by the separation condition. In this case, it is assumed that the top and end of the token string are also included in the N positions. In a case where two positions D_I and D_J are selected from among these N positions, on a condition that the number of tokens between D_I and D_J is smaller than the upper limit number of tokens L that can be input to a model, it is possible to generate input blocks. All combinations of two positions selected from among the N positions are checked and a group of input block candidates is generated. Then, in a case where it is possible to select a combination with which all the tokens can be processed by selecting P input blocks from among the group of input block candidates, those blocks are taken as input blocks. On the other hand, in a case where it is not possible to process all the tokens no matter how P input blocks are selected from among the group of input block candidates, it is sufficient to change the separation condition to a separation condition that enables a finer separation and repeat the same processing. The effect of the present modification example is explained in a comparison with a case where input blocks are generated by applying a separation condition after determining a temporary block. In FIG. 9, a token string 900 has a length of T. D_1 to D_6 indicate positions at which separation is possible by a certain separation condition. Here, the number of processing times P=3.

First, a comparative example is explained. In FIG. 9, three blocks 920, 921, and 922 shown in the center represent input blocks generated by deleting part of tokens in accordance with the current separation condition for three temporary blocks 910, 911, and 912 shown on the left side. In this case, it is noticed that the token string between the separation position D_3 and the separation position D_4 cannot be processed. As a result, the processing is continued by changing the separation condition to a separation condition that enables a finer separation, or the processing is performed by increasing the number of processing times P from three to four.

On the other hand, in a case of the present modification example, input blocks are generated based on the determined separation positions, and therefore, it is possible to obtain three input blocks 930, 931, and 932 shown on the right side in FIG. 9. That is, in a case of the present modification example, it is possible to generate input blocks without the need to change the separation condition or the number of processing times, and as result of that, highly accurate named entity estimation that also suppresses the processing time is enabled.

Modification Example 4

Figure 10:
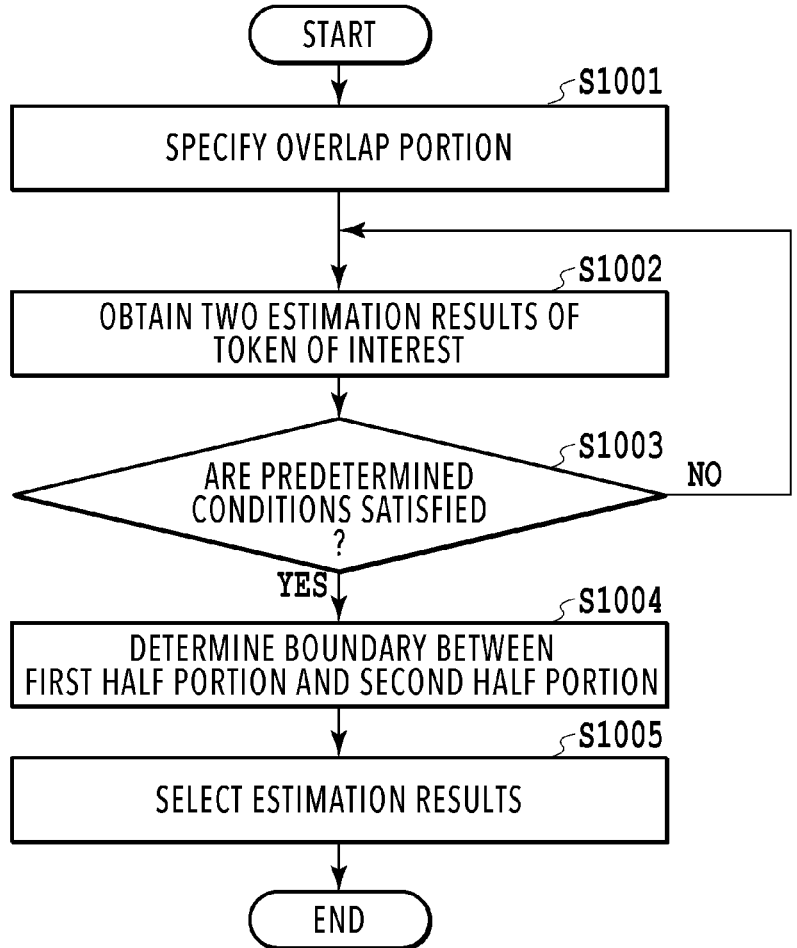
FIG. 10 is a flowchart showing a processing procedure to determine estimation results according to modification example 4.

In a case of selecting one from among a plurality of named entity estimation results for each token at the overlap portion, it may also be possible for the determination unit 208 to determine the selection depending on whether the token is a token belonging to the first half portion of the overlap portion or a token belonging to the second half portion of the overlap portion. Specifically, for the token belonging to the first half portion, the estimation results of the input block closer to the top of the token string are used and for the token belonging to the second half portion, the estimation results of the input block closer to the end of the token string are employed. In the following, a flow of processing in the determination unit 208 according to the present modification example is explained with reference to the flowchart in FIG. 10.

Figure 11:
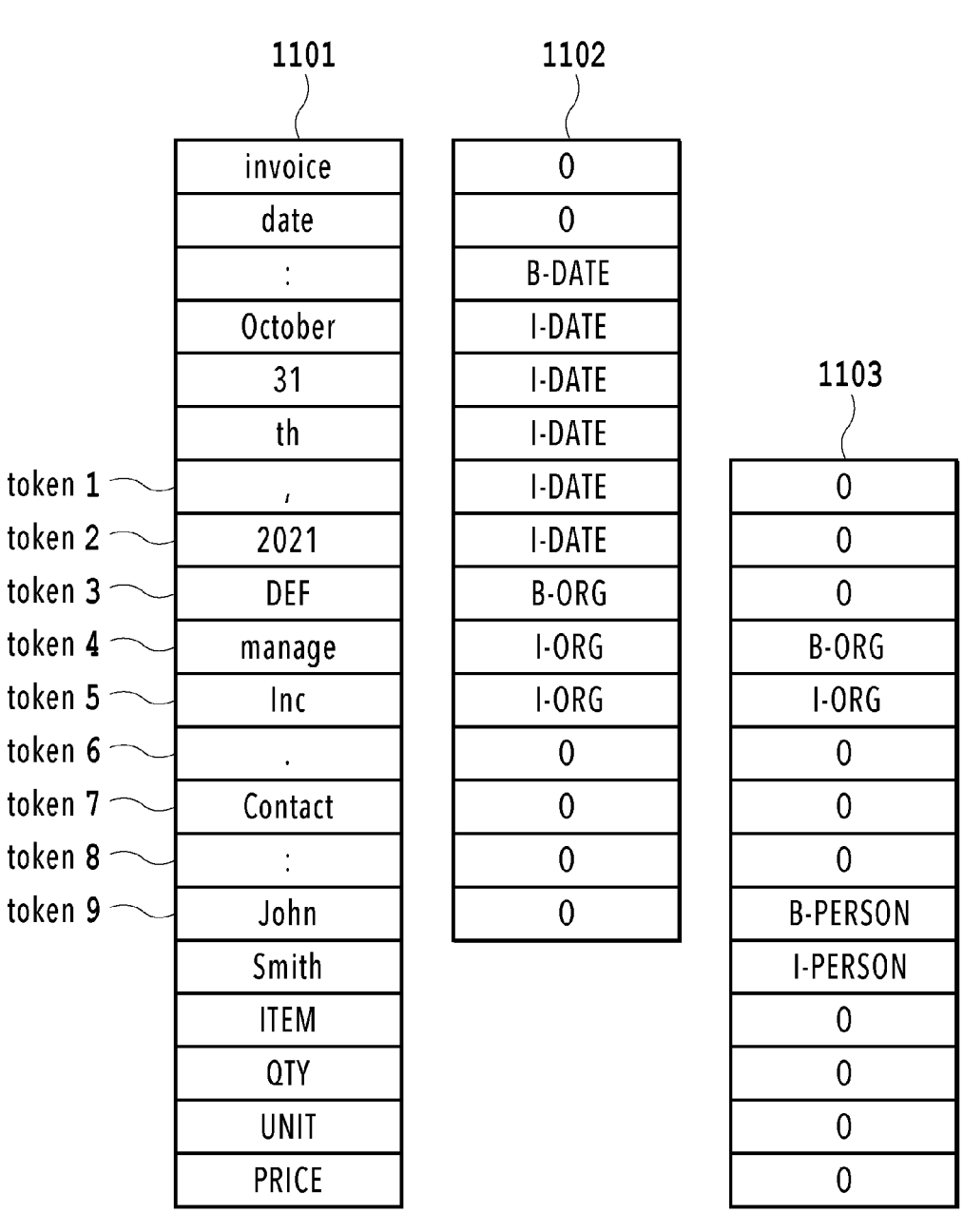
FIG. 11 is a diagram explaining effects of modification example 4.

At S1001, among the estimation results of the named entity tags corresponding to a plurality of input blocks, a portion that overlaps is specified. Here, explanation is given with reference to a specific example in FIG. 11. Here, for a token string 1101, estimation results 1102 of named entity tags for a first input block and estimation results 1103 of named entity tags for a second input block are obtained. Between the first input block and the second input block, token 1 to token 9 overlap and a plurality of estimation results is obtained. In this case, the token string from token 1 to token 9 is specified as an overlap portion.

At S1002, a token of interest in the specified overlap portion is determined and for the token of interest, two estimation results are obtained. At this time, the token of interest is determined among each token included in the specified overlap portion in order from the token closest to the top.

At S1003, the processing is branched in accordance with whether the two obtained estimation results satisfy predetermined conditions. Here, the predetermined conditions are as follows.
<<Condition 1>>
   Two estimation results are identical
<<Condition 2>>
   Tow estimation results are the tag (in the present embodiment, "O") other than the named entity tags to be estimated (in the present embodiment, "B-ORG", "I-ORG", "B-PERSON", "I-PERSON", "B-DATE", "I-DATE")
<<Condition 3>>
   Two tokens that satisfy condition 1 and condition 2 are continuous In a case where all the three conditions described above are satisfied, the processing advances to S1004 and in a case where all the conditions are not satisfied, the processing returns to S1002, and the next token of interest is determined and the processing is continued. For example, in the example in FIG. 11, in a case where attention is focused on token 1 of the character string ",", the estimation results 1102 of the first input block are "I-DATE" and the estimation results 1103 of the second input block are "O" and they do not match, and therefore, condition 1 is not satisfied. Further, the estimation results 1102 of the first input block are "I-DATE", and therefore, condition 2 is not satisfied also. Consequently, in this case, the processing returns to S1002, and token 2 of the character string "2021" is determined to be the token of interest and the processing is continued. In this manner, the check is performed in order until the token that satisfies the three conditions described above is found. In the example in FIG. 11, token 7 of the character string "Contact" satisfies condition 1 and condition 2 and further, token 8 of the character ":" satisfies condition 1 and condition 2, and therefore, condition 3 is also satisfied. Consequently, in the stage in which the processing has advanced to token 8, the processing advances to S1004.

At S1004, a boundary is determined by taking the first half portion as from token 1 to the token before the tokens satisfying the above-described predetermined conditions and the second half portion as from the tokens satisfying the above-described predetermined conditions and the subsequent tokens. In the example in FIG. 11, the boundary is determined between token 6 and token 7 so that token 1 to token 6 among token 1 to token 9 included in the overlap portion are included in the first half portion and token 7 to token 9 are included in the second half portion.

At S1005, in accordance with the determined boundary, for the token belonging to the first half portion, the estimation results of the first input block are employed and for the token belonging to the second half portion, the estimation results of the second input block are employed.

The above is the determination method of the estimation results of each token in the overlap portion. There is a case where tokens that satisfy all conditions 1 to 3 described above are not found after all the tokens included in the overlap portion are checked. In this case, it may also be possible to branch the processing at S1003 in accordance with whether two remaining conditions are satisfied in a case where one of condition 1 and condition 2 is omitted. In a case where tokens that satisfy the conditions are not found still, for example, in the example in FIG. 11 described above, it may also be possible to divide the overlap portion into the first half portion and the second half portion at the center, such as that token 5 of "Inc" and previous tokens are included in the first half portion and token 6 of "." and subsequent tokens are included in the second half portion. Alternatively, it may also be possible to divide the overlap portion into the first half portion and the second half portion in accordance with a ratio by determining the ratio in advance for determining the boundary position, for example, such as that the entire overlap portion is taken to be 1 and the portion from the top to the position corresponding to 0.7 is determined to be included in the first half portion. Further, condition 3 is not limited to that two tokens that satisfy condition 1 and condition 2 are continuous and may be that three tokens such as those are continuous or may be that there is one token such as this (that is, it is required to satisfy only condition 1 and condition 2).

As described above, it may also be possible to determine which of the estimation results is employed depending on whether the token is a token belonging to the first half portion or a token belonging to the second half portion. Due to this, it is possible to employ the estimation results continuous within one input block, and therefore, the estimation accuracy improves.

Modification Example 5

In a case of selecting one from among a plurality of named entity estimation results for each token of the overlap portion, it may also be possible for the determination unit 208 to change the selection method depending on whether the system type gives priority to the recall ratio or the adaptation ratio for the named entity estimation. In the following, explanation is given by using a specific example.

<<In a Case of System Type Giving Priority to Recall Ratio>>

This type of system is a system that presents a plurality of named entity estimation results to a user and provides a user interface (UI) for causing the user to select a desired named entity. In a case of this type, on a condition that there exists an undetected named entity, it is no longer possible for the user to select the named entity. Consequently, it is appropriate to return estimation results as many as possible. For this type of system, in a case where the estimation results of the named entity tag of each of the first input block and the second input block are different in the overlap portion and one of them is "O", the estimation results that are not "O" are selected. Further, in a case where both the estimation results are other than "O" (that is, both the estimation results are the named entity tags to be estimated), the estimation results that do not constitute a violation as the tag in the IOB format are selected from the estimation results in the previous and subsequent tokens. For example, a case is considered where two named entity tags of "I-ORG" and "I-PERSON" are estimated for the token of interest. In this case, on a condition that the estimation results of the one previous token are "B-ORG", that "I-PERSON" follows is a violation, and therefore, "I-ORG" is selected. In a case where either of the estimation results may be selected without constituting any violation, the estimation results whose score is higher are selected. By doing so, it is possible to improve the user value.

<<In a Case of System Type Giving Priority to Adaptation Ratio>>

This type of system is a system that is configured to automatically perform processing of another task by using named entity estimation results. In a case of this type, on a condition that an over-detection occurs, another task is also processed as a result of that, and therefore, a higher adaptation ratio is desirable. As the system such as this, mention is made of, for example, a system in which in a case where a company name of "XX Inc." is extracted as the named entity estimation results, the mail corresponding to the character string obtained by the OCR unit 201 is deleted, and the like. In the type of system such as this in which priority is given to the adaptation ratio, in a case where the estimation results of two named entity tags are different in the overlap portion, or in a case where the score of the estimated named entity tag is lower than a threshold value, the tag of "O" is determined. In this manner, in the type of system that gives priority to the adaptation ratio, by the determination unit 208 determining the estimation results so that the over-detection is suppressed, it is possible to improve the user value.

Further, it may also be possible to switch the selection methods in the determination unit 208 in accordance with selection results by a user by enabling the user also to select whether to give priority to the recall ratio or the adaptation ratio.

Modification Example 6

In the embodiment described above, the example is explained in which all the tokens obtained by the OCR unit 201 are processed, but the embodiment is not limited to the example. For example, it may also be possible to additionally perform processing to delete tokens not necessary for the named entity estimation before performing the calculation of the number of processing times (S504) after performing the conversion into the token string (S503) in the flowchart in FIG. 5. In a case of the present modification example, the token string from which unnecessary tokens have been deleted is delivered to the number of processing times calculation unit 203. The method of detecting unnecessary tokens from the token string is not limited. For example, in a case where it is desired to estimate a named entity from only Japanese by taking text data in which Japanese and English exist in a mixed manner as a target, English character strings are not necessary. In this case, it is sufficient to detect and delete English tokens. Further, in a case where the named entity is not estimated from the character string in the header or footer of a document, it may also be possible to delete the character string belonging to the header or footer based on the information on the position and font size of the character string in the OCR unit 201. Specifically, in a case where text data is obtained from a document image, information on the position and font size within a document is also obtained for each character string. Then, based on the obtained information on the position and font size, for example, the token whose position of the character string is above a redetermined position (for example, the position 10% above the top end) within the document and whose font size is smaller than or equal to a predetermined size is determined to be the character string belonging to the header and deleted. Similarly, the token whose position of the character string is under a redetermined position (for example, the position 10% under the bottom end) within the document and whose font size is smaller than or equal to a predetermined size is determined to be the character string belonging to the footer and deleted. Due to this, the number of tokens configuring the processing-target token string is reduced, and therefore, it is possible to improve the estimation accuracy of a named entity by reducing the number of processing times to reduce the processing time and by increasing the area of the overlap portion even though the number of processing times is the same.

Other Embodiment

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to improve accuracy of named entity extraction while suppressing an increase in processing time.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-077175, filed May 9, 2022 which is hereby incorporated by reference wherein in its entirety.

What is claimed is:

1. An information processing apparatus that extracts a named entity from a document by using a natural language processing model, the apparatus comprising:

one or more memories storing instructions; and one or more processors executing the instructions to:

(a) obtain a maximum number (L) of tokens that can be input at a time to the natural language processing model;

(b) obtain text data from a document image read from the document;

(c) convert the text data into a token string by performing processing to decompose the text data into each token;

(d) divide the token string into blocks that can be processed by the natural language processing model, each of the block is a group of tokens;

(e) calculate a number of processing times (P) necessary for performing processing in the natural language processing model based on a length (T) of the token string, the maximum number of tokens (L), and a number of tokens (M) desired to be overlapped between adjacent blocks among blocks generated by dividing the token string;

(f) estimate a named entity by performing processing to input each of the blocks to the natural language processing model; and (g) provide a user interface for causing a user to select a desired named entity from estimation results obtained from each of the blocks, wherein (h) in the calculating, a minimum number of processing times necessary for processing all of the tokens included in the token string as the number of processing times (P) necessary for performing processing in the natural language processing model is calculated; and (i) in the dividing, based on the calculated minimum number of processing times (P), the token string is divided into the blocks so that M tokens to be overlapped between the two adjacent blocks and (j) in the processing, for each of the token belonging to the overlap portion which are overlapped M tokens between the two adjacent blocks, one of estimation results obtained from each of the blocks is selected and (k) in the processing, on a condition that the estimation results obtained from the tokens belonging to the overlap portion are different and an estimation result obtained from one of the tokens belonging to the overlap portion is an estimation result representing not being a named entity, estimation results representing a named entity are selected.

2. The information processing apparatus according to claim 1, wherein the one or more processors execute the instructions to:

obtain a separation condition for separating the token string into predetermined units and in the dividing, based on the separation condition, the token string is divided into the blocks.

3. The information processing apparatus according to claim 2, wherein in the obtaining the separation condition, a plurality of separation conditions whose levels of fineness in a case where the token string is separated are different and in the dividing, the token string is divided into the blocks by changing the separation condition in order that is applied among the plurality of separation conditions so that the calculated number of processing times does not increase.

4. The information processing apparatus according to claim 3, wherein in the dividing:

a same number of temporary blocks as the number of processing times is determined in accordance with the maximum number of tokens (L) of the block for the token string; and the block is generated by deleting a token located at the end of the temporary block in accordance with the separation condition.

5. The information processing apparatus according to claim 4, wherein in the dividing, the plurality of separation conditions is applied in order from the separation condition whose separation is the largest and processing is repeated until there is not a single portion at which no overlap exists between all the adjacent blocks from which a token located at the end of the temporary block has been deleted.

6. The information processing apparatus according to claim 5, wherein in the dividing, the plurality of separation conditions is applied in order from the separation condition whose separation is the largest and even in a case where there is a portion at which no overlap exists between some of the adjacent blocks from which a token located at the end of the temporary block has been deleted, on a condition that the two adjacent blocks corresponding to the portion at which no overlap exists overlap each other in a state of being of the temporary block and the token next to the last token of a front side block obtained by deleting the token at the end is the top token of a rear side block, the processing is terminated at that point in time.

7. The information processing apparatus according to claim 3, wherein in the separation conditions, two or more of separation between paragraphs, separation between lines, separation at period, separation at comma, colon, and semicolon, and separation between tokens are included and the separation conditions allow for separation of the token string further in order of separation between paragraphs, separation between lines, separation at period, separation at comma, colon, and semicolon, and separation between tokens.

8. The information processing apparatus according to claim 1, wherein in the processing, the overlap portion is divided into a first half portion and a second half portion and for a token belonging to the first half portion, estimation results of a top block among blocks included in the overlap portion are determined as its named entity and for a token belonging to the second half portion, estimation results of an end block among blocks included in the overlap portion are determined as its named entity.

9. The information processing apparatus according to claim 8, wherein in the processing, the overlap portion is divided into the first half portion and the second half portion in accordance with a predetermined condition for determining a boundary between the first half portion and the second half portion.

10. The information processing apparatus according to claim 1, wherein in the processing, in a case where priority is given to recall ratio in named entity estimation, on a condition that estimation results of one of the tokens belonging to the overlap portion are estimation results representing not being a named entity, estimation results presenting a named entity are selected.

11. The information processing apparatus according to claim 1, wherein in the processing, in a case where priority is given to adaptation ratio in named entity estimation, on a condition that estimation results of the tokens belonging to the overlap portion are different, estimation results representing not being a named entity are determined.

12. The information processing apparatus according to claim 1, wherein the one or more processors execute the instructions to:
delete an unnecessary token from the converted token string and in the calculating, calculation of the number of processing times is performed for the token string from which the unnecessary token has been deleted.

13. The information processing apparatus according to claim 1, wherein in the estimation results, a score representing likelihood of a named entity tag corresponding to a token is included in the estimation results, and in the processing, one of estimation results is selected based on the score for a token belonging to the overlap portion of the block.

14. An information processing method of extracting a named entity from a document by using a natural language processing model, the method comprising the steps of:

obtaining a maximum number (L) of tokens that can be input at a time to the natural language processing model;

obtaining text data from a document image read from the document;

converting the text data into a token string by performing processing to decompose the text data into each token;

dividing the token string into blocks that can be processed by the natural language processing model, each of the block is a group of tokens;

calculating a number of processing times (P) necessary for performing processing in the natural language processing model based on a length (T) of the token string, the maximum number of tokens (L), and a number of tokens (M) desired to be overlapped between adjacent blocks among blocks generated by dividing the token string;

estimating a named entity by performing processing to input each of the blocks to the natural language processing model; and providing a user interface for causing a user to select a desired named entity from estimation results obtained from each of the blocks, wherein in the calculating, a minimum number of processing times necessary for processing all of the tokens included in the token strings as the number of processing times (P) necessary for performing processing in the natural language processing model is calculated; and in the dividing, based on the calculated minimum number of processing times (P), the token string is divided into the blocks so that M tokens to be overlapped between the two adjacent blocks and in the processing, for each of the token belonging to the overlap portion which are overlapped M tokens between the two adjacent blocks, one of estimation results obtained from each of the blocks is selected and in the processing, on a condition that the estimation results obtained from the tokens belonging to the overlap portion are different and an estimation result obtained from one of the tokens belonging to the overlap portion is an estimation result representing not being a named entity, estimation results representing a named entity are selected.

15. A non-transitory computer readable storage medium storing a program for causing a computer to perform an information processing method of extracting a named entity from a document by using a natural language processing model, the method comprising the steps of:

obtaining a maximum number (L) of tokens that can be input at a time to the natural language processing model;

obtaining text data from a document image read from the document;

converting the text data into a token string by performing processing to decompose the text data into each token;

dividing the token string into blocks that can be processed by the natural language processing model, each of the blocks is a group of tokens;

calculating a number of processing times (P) necessary for performing processing in the natural language processing model based on a length (T) of the token string, the maximum number of tokens (L), and a number of tokens (M) desired to be overlapped between adjacent blocks among blocks generated by dividing the token string;

estimating a named entity by performing processing to input each of the blocks to the natural language processing model; and providing a user interface for causing a user to select a desired named entity from estimation results obtained from each of the blocks, wherein in the calculating, a minimum number of processing times necessary for processing all of the tokens included in the token string as the number of processing times (P) necessary for performing processing in the natural language processing model is calculated; and in the dividing, based on the calculated minimum number of processing times (P), the token string is divided into the blocks so that M tokens to be overlapped between the two adjacent blocks and in the processing, for each of the token belonging to the overlap portion which are overlapped M tokens between the two adjacent blocks, one of estimation results obtained from each of the blocks is selected and in the processing, on a condition that the estimation results obtained from the tokens belonging to the overlap portion are different and an estimation result obtained from one of the tokens belonging to the overlap portion is an estimation result representing not being a named entity, estimation results representing a named entity are selected.

* * * * *